(12) United States Patent
Wang et al.

(10) Patent No.: US 9,712,900 B1
(45) Date of Patent: Jul. 18, 2017

(54) COMMUNICATION DEVICE

(71) Applicant: Google Inc., Mountain View, CA (US)

(72) Inventors: Chiachi Wang, Union City, CA (US); Romain Clement, Mountain View, CA (US)

(73) Assignee: Google Inc., Mountain View, CA (US)

( * ) Notice: Subject to any disclaimer, the term of this patent is extended or adjusted under 35 U.S.C. 154(b) by 602 days.

(21) Appl. No.: 14/253,394

(22) Filed: Apr. 15, 2014

(51) Int. Cl.
*H04J 14/00* (2006.01)
*H04Q 11/00* (2006.01)
*H04J 14/02* (2006.01)
*H04B 10/50* (2013.01)
*H01S 3/067* (2006.01)

(52) U.S. Cl.
CPC ..... *H04Q 11/0005* (2013.01); *H01S 3/06754* (2013.01); *H04B 10/50* (2013.01); *H04J 14/02* (2013.01); *H04Q 2011/0016* (2013.01); *H04Q 2011/0041* (2013.01)

(58) Field of Classification Search
None
See application file for complete search history.

(56) References Cited

U.S. PATENT DOCUMENTS

| | | | | |
|---|---|---|---|---|
| 4,867,560 | A  * | 9/1989 | Kunitsugu | B23K 26/04 219/121.76 |
| 6,243,178 | B1 * | 6/2001 | Suemura | H04Q 11/0005 398/56 |
| 2003/0090763 | A1 * | 5/2003 | Yang | G02B 6/2931 398/87 |
| 2007/0127928 | A1 | 6/2007 | Varshneya et al. | |
| 2013/0083925 | A1 | 4/2013 | Nordholt et al. | |

FOREIGN PATENT DOCUMENTS

| | | |
|---|---|---|
| WO | WO-2014011314 A1 | 1/2014 |
| WO | WO-2014025426 A2 | 2/2014 |

\* cited by examiner

*Primary Examiner* — Ken N Vanderpuye
*Assistant Examiner* — David Lambert
(74) *Attorney, Agent, or Firm* — Honigman Miller Schwartz and Cohn LLP

(57) ABSTRACT

A communication method includes combining first and second optical signals into a third optical signal, processing the third optical signal, and separating the third optical signal back into the first and second optical signals. The method includes sending the first optical signal out a first system port, sending the second optical signal out a second system port, receiving a fourth optical signal in the first system port, and receiving a fifth optical signal in the second system port. The method also includes combining the fourth and fifth optical signals into a sixth optical signal, processing the sixth optical signal, and separating the sixth optical signal back into the fourth and fifth optical signals.

28 Claims, 13 Drawing Sheets

COMMUNICATION DEVICE

TECHNICAL FIELD

This disclosure relates to communication devices.

BACKGROUND

A communication network is a large distributed system for receiving information (e.g., a signal) and transmitting the information to a destination. Over the past few decades the demand for communication access has dramatically increased. Although conventional wire and fiber landlines, cellular networks, and geostationary satellite systems have continuously been increasing to accommodate the growth in demand, the existing communication infrastructure is still not large enough to accommodate the increase in demand. In addition, some areas of the world are not connected to a communication network and therefore cannot be part of the global community where everything is connected to the internet.

Satellites and high-altitude communication balloons are used to provide communication services to areas where wired cables cannot reach. Satellites may be geostationary or non-geostationary. Geostationary satellites remain permanently in the same area of the sky as viewed from a specific location on earth, because the satellite is orbiting the equator with an orbital period of exactly one day. Non-geostationary satellites typically operate in low- or mid-earth orbit, and do not remain stationary relative to a fixed point on earth; the orbital path of a satellite can be described in part by the plane intersecting the center of the earth and containing the orbit. Each satellite may be equipped with communication devices called inter-satellite links (or, more generally, inter-device links) to communicate with other satellites in the same plane or in other planes. The communication devices allow the satellites to communicate with other satellites. These communication devices are expensive and heavy. In addition, the communication devices significantly increase the cost of building, launching and operating each satellite; they also greatly complicate the design and development of the satellite communication system and associated antennas and mechanisms to allow each satellite to acquire and track other satellites whose relative position is changing. Each antenna has a mechanical or electronic steering mechanism, which adds weight, cost, vibration, and complexity to the satellite, and increases risk of failure. Requirements for such tracking mechanisms are much more challenging for inter-satellite links designed to communicate with satellites in different planes than for links, which only communicate with nearby satellites in the same plane, since there is much less variation in relative position. Similar considerations and added cost apply to high-altitude communication balloon systems with inter-balloon links.

SUMMARY

One aspect of the disclosure provides a communication device that includes an optical device, a router in optical communication with the optical device, and a combiner in optical communication with the optical device and the router. When the optical device receives a first combined optical signal, the optical device separates the first combined signal into first and second optical signals, sends the first optical signal to a first input/output, and sends the second optical signal to the router. The router routes the second optical signal to a second input/output. When the optical device receives a third optical signal from the first input/output, the optical device sends the third optical signal to the combiner. When the router receives a fourth optical signal from the second input/output, the router routes the fourth optical signal to the combiner, which combines the third and fourth optical signals as a second combined optical signal.

Implementations of the disclosure may include one or more of the following features. In some implementations, the communication device includes a first signal processor in optical communication with the optical device. The first processor processes the first combined optical signal and sends the processed first combined optical signal to the optical device. The communication device may also include a second signal processor in optical communication with the combiner and a separator in optical communication with the second signal processor. The second signal processor processes the second combined optical signal. The separator separates the second combined optical signal back into the third and fourth optical signals. The first signal processor or the second signal processor may be an optical amplifier, such as an erbium doped fiber amplifier, an erbium % ytterbium co-doped fiber amplifier, an ytterbium doped fiber amplifier, a thulium doped fiber amplifier, a holmium doped fiber amplifier, or a rare earth doped fiber amplifier.

In some implementations, the optical device includes first, second, third and fourth device ports. The optical device is configured to receive in the first device port the first combined optical signal, separate the first combined optical signal into the first and second optical signals, send the first optical signal out of the third device port, and send the second optical signal out of the second device port. The optical device is also configured to receive the third optical signal in the third device port and send the third optical signal out of the fourth device port. The optical device may include a wavelength division multiplexer, an optical interleaver, an optical circulator, or a combination thereof. The wavelength division multiplexer multiplexes or demultiplexes optical signals. The interleaver combines/separates two sets of dense wavelength-division multiplexing channels into/from a composite signal stream in an interleaving manner. The optical circulator has three circulator ports. The optical circulator routes an optical signal received in any one circulator port to exit an adjacent circulator port in a clockwise or counter-clockwise order.

In some implementations, the router includes first, second, and third router ports. The first router port is in optical communication with the second device port. The router is configured to receive in the first router port the second optical signal from the second device port and send the second optical signal out of the second router port. The router is also configured to receive the fourth optical signal in the second router port and send the fourth optical signal out of the third router port. The router comprises a wavelength division multiplexer, an optical interleaver, an optical circulator, or a combination thereof.

Another aspect of the disclosure provides a communication device including first and second combiners, first and second signal processors (e.g., optical amplifiers), an optical device, a router, and a separator. The first combiner receives and combines first and second optical signals into a third optical signal. The first signal processor is in optical communication with the first combiner and processes the third optical signal. The optical device is in optical communication with the first signal processor and has first, second, third and fourth device ports. When the optical device receives in the first device port the third optical signal from the first signal processor, the optical device separates the third optical signal back into the first and second optical signals. The optical device is also configured to send the first optical signal out of the third device port and send the second optical signal out of the second device port. When the optical device receives a fourth optical signal in the third device port, the optical device sends the fourth optical signal out of the fourth device port. The router has first, second, and third router ports, where the first router port is in optical communication with the second device port. When the router receives in the first router port the second optical signal from the second device port, the router sends the second optical signal out of the second router port. When the router receives a fifth optical signal in the second router port, the router sends the fifth optical signal out of the third router port. The second combiner is in optical communication with the optical device and the router. The second combiner receives the fourth optical signal from the optical device and the fifth optical signal from the router and combines the fourth and fifth optical signals into a sixth optical signal. The second signal processor is in optical communication with the second combiner and processes the sixth optical signal. Finally, the separator is in optical communication with the second signal processor, the separator separates the sixth optical signal back into the fourth and fifth optical signals.

In some implementations, the communication device further includes first and second transmitters and first and second modulators. The first transmitter transmits the first optical signal, and the second transmitter transmits the second optical signal. The first modulator optically communicates with the first transmitter and the first combiner and modulates the first optical signal. The second modulator optically communicates with the second transmitter and the first combiner and modulates the second optical signal. In some examples, the separator routes the fourth optical signal to a first receiver and the fifth optical signal to a second receiver.

In some implementations, the first combiner, the second combiner, and the separator each includes a wavelength division multiplexer or an optical interleaver. The wavelength division multiplexer multiplexes or demultiplexes optical signals, while the interleaver combines/separates two sets of dense wavelength-division multiplexing channels into/from a composite signal stream in an interleaving manner. Moreover, the optical device and/or the router may include a wavelength division multiplexer, an optical interleaver, an optical circulator, or a combination thereof.

The first signal processor or the second signal processor may be an optical amplifier. In some examples, the optical amplifier includes an erbium doped fiber amplifier, an erbium/ytterbium co-doped fiber amplifier, an ytterbium doped fiber amplifier, a thulium doped fiber amplifier, a holmium doped fiber amplifier, or a rare earth doped fiber amplifier.

In some examples, the communication device includes first and second collimators. The first collimator optically communicates with the third device port, and the second collimator optically communicates with the second router port.

Another aspect of the disclosure provides a communication device that includes first and second transmitters transmitting first and second optical signals, respectively. The communication device also includes first and second modulators. The first modulator optically communicates with the first transmitter and modulates the first optical signal. The second modulator optically communicates with the second transmitter and modulates the second optical signal. The communication module also includes a first combiner that combines the first and second optical signals into a third optical signal, and a first amplifier optically communicating with the first combiner. The first amplifier amplifies the third optical signal. Moreover, the communication device includes an optical device optically communicating with the first amplifier and has first, second, third and fourth device ports. The optical device is configured to: receive in the first device port the third optical signal from the first amplifier; separate the third optical signal back into the first and second optical signals; and send the first optical signal out of the third device port. In addition, the optical device is configured to send the second optical signal out of the second device port; receive a fourth optical signal in the third device port; and send the fourth optical signal out of the fourth device port. The communication device includes a router that has first, second, and third router ports. The first router port optically communicates with the second device port. The router receives in the first router port the second optical signal from the second device port, and then sends the second optical signal out of the second router port. In addition, the router receives a fifth optical signal in the second router port and sends the fifth optical signal out of the third router port. The communication device includes a second combiner optically communicating with the optical device and the router. The second combiner receives the fourth optical signal from the optical device and the fifth optical signal from the router and combines the fourth and fifth optical signals into a sixth optical signal. A second amplifier, included in the communication device, optically communicates with the second combiner and amplifies the sixth optical signal. Moreover, the communication device includes a separator in optical communication with the second amplifier. The separator separates the sixth optical signal back into the fourth and fifth optical signals and the separator routes the fourth optical signal to a first receiver and the fifth optical signal to a second receiver.

Yet another aspect of the disclosure provides a communication method. The method includes combining first and second optical signals into a third optical signal, processing the third optical signal, and separating the third optical signal back into the first and second optical signals. The method includes sending the first optical signal out a first system port, sending the second optical signal out a second system port, receiving a fourth optical signal in the first system port, and receiving a fifth optical signal in the second system port. The method also includes combining the fourth and fifth optical signals into a sixth optical signal, processing the sixth optical signal, and separating the sixth optical signal back into the fourth and fifth optical signals.

In some implementations, the method includes generating the first and second optical signals and modulating the first and second optical signals before combining the first and second optical signals. After processing and separating the sixth optical signal, the method may include sending the fourth optical signal to a first optical receiver and sending the fifth optical signal to a second optical receiver.

In some examples, combining first and second optical signals includes multiplexing the first and second optical signals and separating the third optical signal includes demultiplexing the third optical signal back into the first and second optical signals. Alternatively, combining the first and second optical signals may include interleaving the first and second optical signals, and separating the third optical signal includes de-interleaving the third optical signal back into the first and second optical signals. The first and second optical signals include two sets of dense wavelength-division multiplexing channels.

In some implementations, combining fourth and fifth optical signals includes multiplexing the fourth and fifth optical signals and separating the sixth optical signal includes demultiplexing the sixth optical signal back into the fourth and fifth optical signals. Alternatively, combining fourth and fifth optical signals may include interleaving the fourth and fifth optical signals and separating the sixth optical signal includes de-interleaving the sixth optical signal back into the fourth and fifth optical signals. The fourth and fifth optical signals include two sets of dense wavelength-division multiplexing channels. In some examples, processing the third or sixth optical signal includes amplifying the optical signal using an erbium doped fiber amplifier, an erbium/ytterbium co-doped fiber amplifier, an ytterbium doped fiber amplifier, a thulium doped fiber amplifier, a holmium doped fiber amplifier, or a rare earth doped fiber amplifier.

Sending the second optical signal out the second system port may include sending the second optical signal through a router having first, second, and third router ports, where the second optical signal is received in the first router port and sent out of the second router port. Receiving the fifth optical signal in the second system port includes receiving the fifth optical signal through the router, where the fifth optical signal is received in the second router port and sent out of the third router port. The router may include a wavelength division multiplexer, an optical interleaver, an optical circulator, or a combination thereof.

In some implementations, separating the third optical signal and sending the first optical signal out the first system port includes sending the third optical signal into an optical device having first, second, third and fourth device ports. The first optical port receives the third optical signal and separates the third signal into the first and second optical signals. The first optical signal is sent out of the third device port and the second optical signal is sent out of the second device port. Receiving the fourth optical signal includes receiving the fourth optical signal in the third device port and sending the fourth optical signal out of the fourth device port. The optical device may include a wavelength division multiplexer, an optical interleaver, an optical circulator, or a combination thereof.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
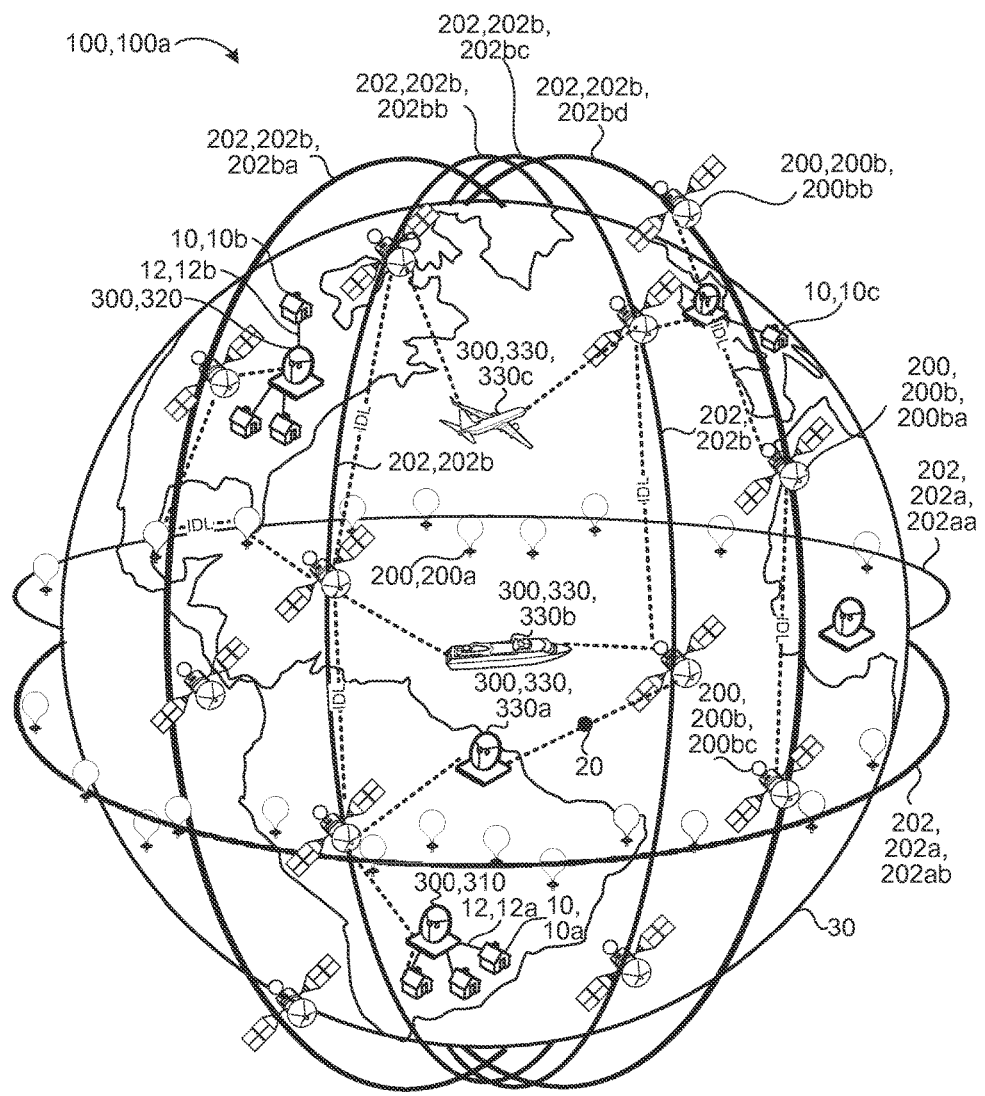
FIG. 1A is schematic view of an exemplary global-scale communication system with satellites and communication balloons, where the satellites form a polar constellation.
Figure 1B:
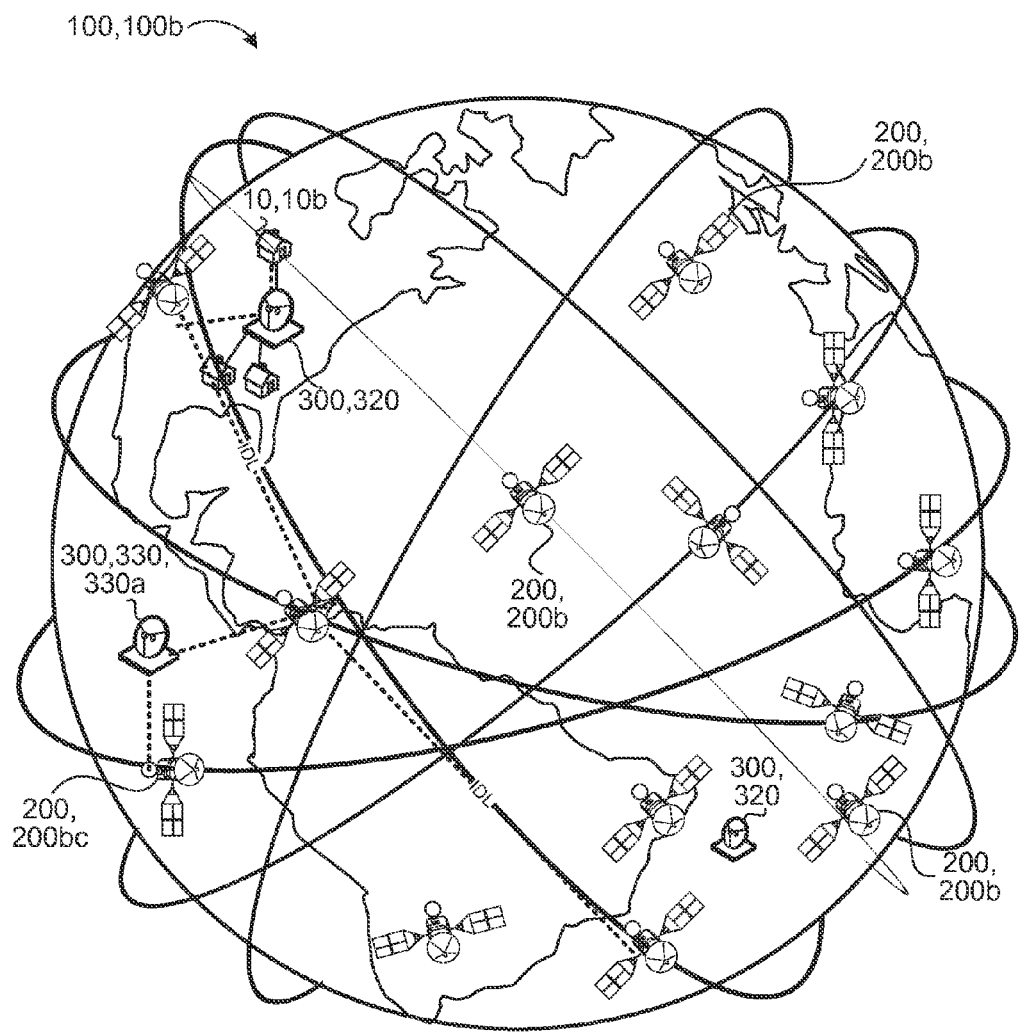
FIG. 1B is schematic view of an exemplary group of satellites of FIG. 1A forming a Walker constellation.
Figure 1D:
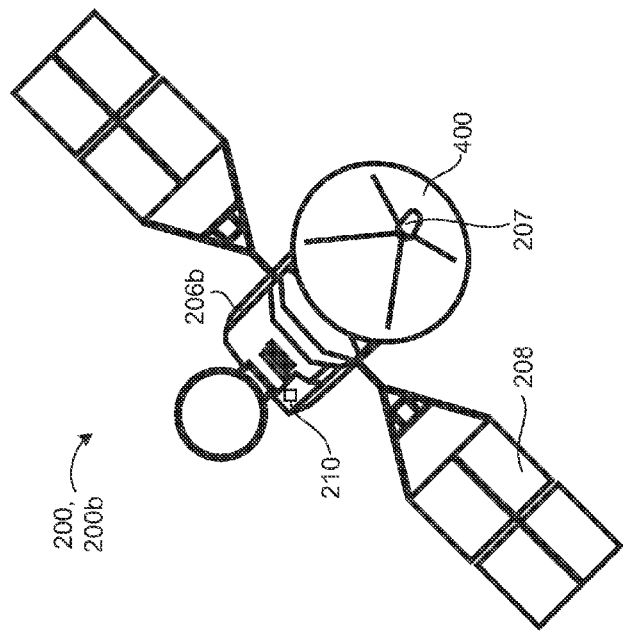
FIG. 1D is a perspective view of an exemplary satellite of the global-scale communication system.
Figure 1C:
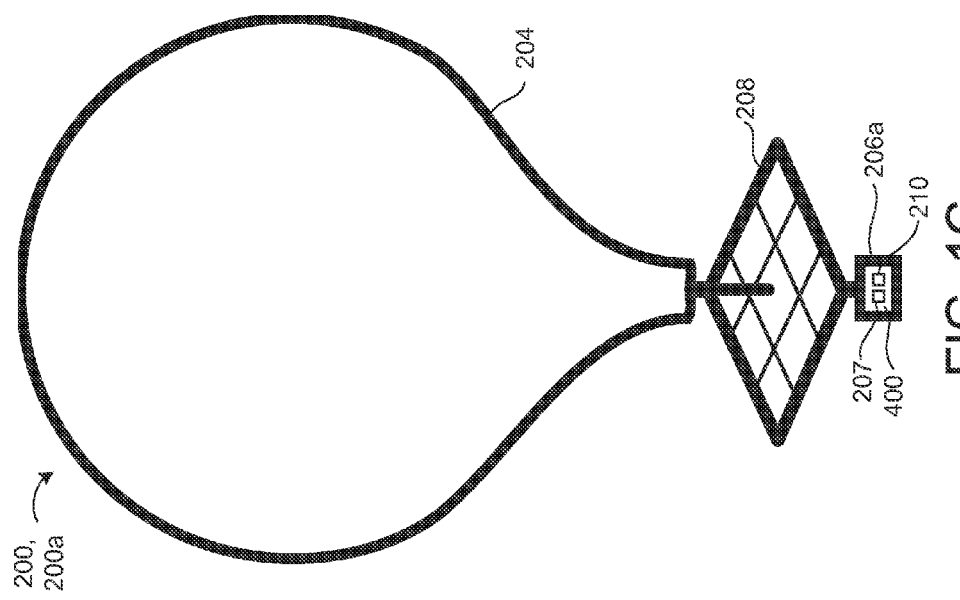
FIG. 1C is a perspective view of an exemplary communication balloon of the global-scale communication system.
Figure 2:
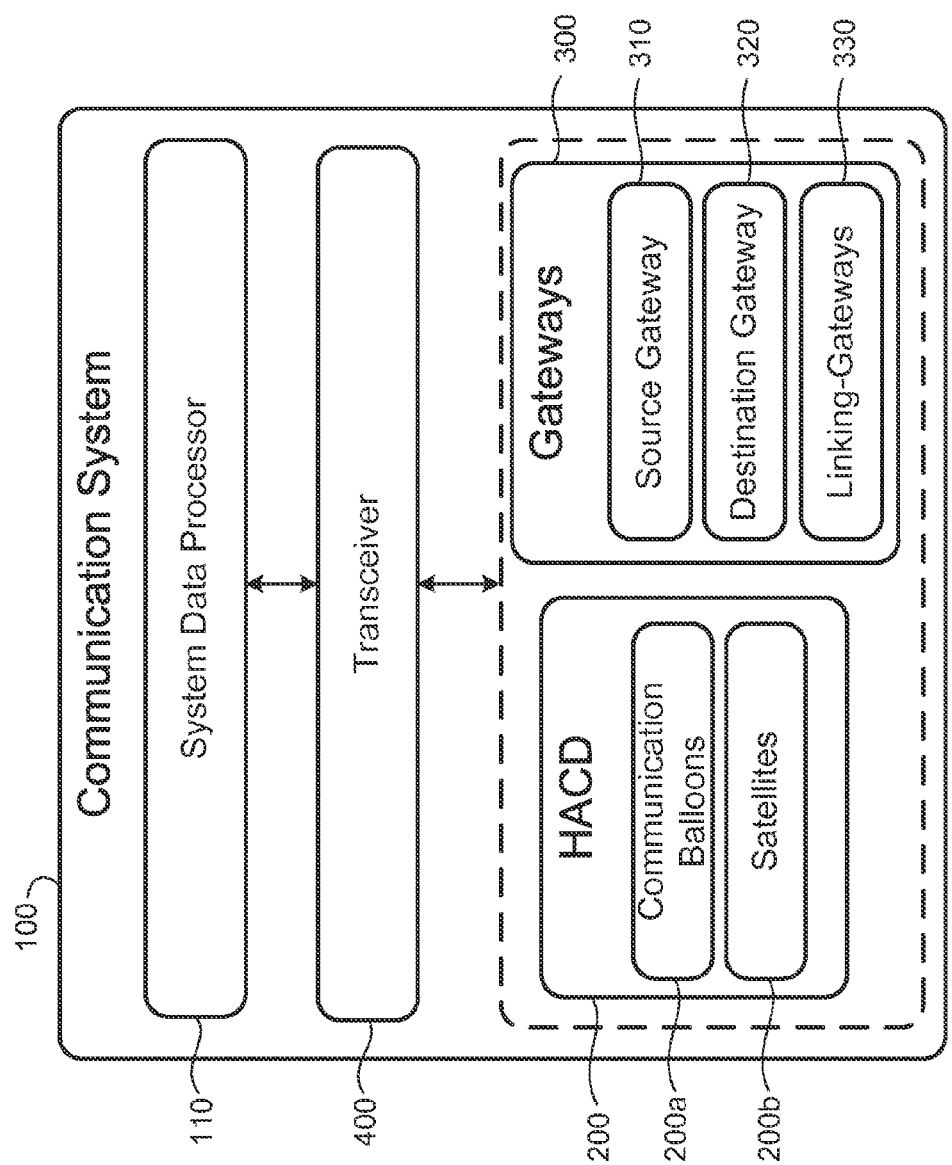
FIG. 2 is a schematic view of an exemplary global-scale communication system.

Referring to FIGS. 1A-2, in some implementations, a global-scale communication system 100 includes High Altitude Communication Devices (HACD) 200, gateways 300 (including source ground stations 310, destination ground stations 320, and linking-gateways 330), and a system data processing device 110. In some examples, the source ground stations 310 and/or the destination ground stations 320 are user terminals or gateways 300 connected to one or more user terminals. An HACD 200 is a device released into the earth's atmosphere. HACD 200 may refer to a communication balloon 200a or a satellite 200b in Low Earth Orbit (LEO) or Medium Earth Orbit (MEO) or High Earth Orbit (HEO), including Geosynchronous Earth Orbit (GEO). The HACD 200 includes an antenna 207 that receives a communication 20 from a source ground station 310 and reroutes the communication signal to a destination ground station 320. The HACD 200 also includes a data processing device 210 that processes the received communication 20 and determines a path of the communication 20 to arrive at the destination ground station 320. The global-scale communication system 100 may include communication balloons 200a, satellites 200b, or a combination of both as shown in FIG. 1A. Additionally, the global-scale communication system 100 includes multiple ground stations 300, such as a source ground station 310, a destination ground station 320, and a linking-gateway 330. The source ground station 310 is in communication with a first user 10a through a cabled, a fiber optic, or a wireless radio-frequency connection 12a, and the destination ground station 320 is in communication with the second user 10b through a cabled, a fiber optic, or a wireless radio-frequency connection 12b. In some examples, the communication between the source ground station 310 and the first user 10a or the communication between the destination ground station 320 and the second user 10b is a wireless communication (either radio-frequency or free-space optical).

The HACDs 200 are divided into groups 202, with each group 202 (also referred to as a plane, since their orbit or trajectory may approximately form a geometric plane) having an orbital path or trajectory different than other groups 202. For example, the balloons 200a as the HACDs 200 rotate approximately along a latitude of the earth 30 (or in a trajectory determined in part by prevailing winds) in a first group or plane 202aa and along a different latitude or trajectory in a second group or plane 202ab. Similarly, the satellites 200b may be divided into a first group or plane 202ba and a second group or plane 202bb. The satellites 200b may be divided into a larger or smaller number of groups 202b. The data processing device 110 may be any one of the data processing devices 210 of the HACDs 200, the data processing device 110 of any of the gateways 300, another data processing device in communication with the HACDs 200 and gateways, or a combination thereof.

The first user 10a may communicate with the second user in 10b or a third user 10c. Since each user 10 is in a different location separated by an ocean or large distances, a communication 20 is transmitted from the first user 10a through the global-scale communication system 100 to reach its final destination, i.e., the second or third users 10b, 10c. Therefore, it is desirable to have a global-scale communication system 100 capable of routing communication signal traffic over long distances, where one location is in a location far from a source or destination ground station 310, 320 (e.g., ocean) by allowing the communication 20 to travel along a path 22 (or link 22). In addition, it is desirable that the HACDs 200 and the gateways 300 of the global-scale communication system 100 communicate amongst each other and between one another, without using complex free space architectures. Moreover, it is desirable to have a cost effective system. Therefore, it is important to reduce the cost of parts that allow such communications, which ultimately reduces the total weight and the size of the HACDs 200 and the gateways 300.

Communication balloons 200a are balloons filled with helium or hydrogen and are released in to the earth's stratosphere to attain an altitude between 11 to 23 miles, and provide connectivity for a ground area of 25 miles in diameter at speeds comparable to terrestrial wireless data services (such as 3G or 4G). The communication balloons 200a float in the stratosphere, at an altitude twice as high as airplanes and the weather (e.g., 20 km above the earth's surface). The high-altitude balloons 200a are carried around the earth 30 by winds and can be steered by rising or descending to an altitude with winds moving in the desired direction. Winds in the stratosphere are usually steady and move slowly at about 5 and 20 mph, and each layer of wind varies in direction and magnitude.

Referring to FIG. 1C, the communication balloons 200a include a balloon 204 (e.g., sized about 49 feet in width and 39 feet in height), an equipment box 206a, and solar panels 208. The equipment box 206a includes a data processing device 210 that executes algorithms to determine where the high-altitude balloon 200a needs to go, then each high-altitude balloon 200a moves into a layer of wind blowing in a direction that will take it where it should be going. The equipment box 206a also includes batteries to store power and a transceiver 400 in communication with the data processing device 210. The transceiver 400 receives and transmits signals from/to other balloons 200a or internet antennas on the ground or gateways 300. The communication balloons 200a also include solar panels 208 that power the equipment box 206a. In some examples, the solar panels 208 produce about 100 watts in full sun, which is enough to keep the communication balloons 200a running while charging the battery and is used during the night when there is no sunlight. When all the high-altitude balloons 200a are working together, they form a balloon constellation. In some implementations, users 10 on the ground have specialized antennas that send communication signals to the communication balloon 200a eliminating the need to have a source or destination ground station 310, 320. The communication balloon 200a receiving the communication 20 sends the communication 20 to another communication balloon 200a until one of the communication balloons 200a is within reach of a destination ground station 320 that connects to the local internet provider and provides service to the user 10 via the network of balloons 200a.

A satellite 200b is an object placed into orbit around the earth 30 and may serve different purposes, such as military or civilian observation satellites, communication satellites, navigations satellites, weather satellites, and research satellites. The orbit of the satellite 200b varies depending in part on the purpose the satellite 200b is being used for. Satellite orbits may be classified based on their altitude from the surface of the earth 30 as Low Earth Orbit (LEO), Medium Earth Orbit (MEO), and High Earth Orbit (HEO). LEO is a geocentric orbit (i.e., orbiting around the earth 30) that ranges in altitude from 0 to 1,240 miles. MEO is also a geocentric orbit that ranges in altitude from 1,200 mile to 22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit.

Multiple satellites 200b working in concert form a satellite constellation. The satellites 200b within the satellite constellation may be coordinated to operate together and overlap in ground coverage. Two common types of constellations are the polar constellation (FIG. 1A) and the Walker constellation (FIG. 1B), both designed to provide maximum earth coverage while using a minimum number of satellites 200b. The system 100a of FIG. 1A includes the satellites 200b arranged in a polar constellation that covers the entire earth 30 and orbits the poles, while the system 100b of FIG. 1B includes satellites 200b arranged in a Walker constellation that covers areas below certain latitudes, which provides a larger number of satellites 200b simultaneously in view of a user 10 on the ground (leading to higher availability, fewer dropped connections).

Referring to FIG. 1D, a satellite 200b includes a satellite body 206b having a data processing device 210, similar to the data processing device 210 of the communication balloons 200a. The data processing device 210 executes algorithms to determine where the satellite 200b is heading. The satellite 200b includes a transceiver 400 that receives and transmits signals from/to other satellites 200b or internet antennas on the ground or gateways 300. The satellite 200b includes solar panels 208 mounted on the satellite body 206b. The solar panels 208 provide power to the satellite 200b. In some examples, the satellite 200b includes rechargeable batteries used when sunlight is not reaching and charging the solar panels 208.

When constructing a global-scale communications system 100 from multiple HACDs 200, it is sometimes desirable to route traffic over long distances through the system 100 by linking one HACD 200 to another or to a gateway 300. For example, two satellites 200b, two balloons 200a, or a satellite 200a and a balloon 200a may communicate via optical links 22. In some examples, optical links 22 between two similar devices are called inter-device link (IDL) 22. In addition, HACDs 200 and gateways 300 may communicate using optical links 22. In such case, the gateways 300 may also include a transceiver 400 or other component capable of communicating with the transceiver 400 (of the communication balloon 200a or the satellite 200b). Such optical links 22 are useful to provide communication services to areas far from source and destination ground stations 310, 320 and may also reduce latency and enhance security.

In some implementations, long-scale HACD constellations (e.g., balloon constellation or satellite constellations) are described in terms of a number of planes or groups 202, and the number of HACDs 200 per plane 202. HACDs 200 within the same plane 202 maintain the same position relative to their intra-plane HACD 200 neighbors. However, the position of an HACD 200 relative to neighbors in an adjacent plane 202 varies over time. For example, in a large-scale satellite constellation with near-polar orbits, satellites 200b within the same plane (which corresponds roughly to a specific latitude, at a given point in time) 202ba (FIG. 1A) maintain a roughly constant position relative to their intra-plane neighbors (i.e., a forward and a rearward satellite 200b), but their position relative to neighbors in an adjacent plane 202*bb*, 202*bc*, 202*bd* varies over time. A similar concept applies to the communication balloons 200*a*; however, the communication balloons 200*a* rotate the earth 30 about its latitudinal plane and maintain roughly a constant position to its neighboring communication balloons 200*a* (see the balloon planes 202*aa*, 202*ab* in FIG. 1A).

Optical links 22 eliminate or reduce the number of HACDs 200 to gateway hops (due to the ability to link HACDs 200), which decreases the latency and increases the overall network capabilities. Optical links 22 allow for communication traffic from one HACD 200 covering a particular region to be seamlessly handed over to another HACD 200 covering the same region, where a first HACD 200 is leaving the first area and a second HACD 200 is entering the area.

In some implementations, an HACD constellation includes HACDs 200 having enough optical links 22 to make the constellation fully-connected, where each HACD 200 is equipped with communication equipment and additional antennas to track the location of other HACDs 200 in the same plane 202 or in other adjacent planes 202 in order to communicate with the other satellites 200*b*. This increases the cost of the HACD 200, since it adds additional hardware (e.g., the additional antennas) and computations for the HACD 200 to track HACDs 200 in other planes 202 whose position is constantly changing. Therefore, to maintain the simplicity and low cost of design, construction, and launch of the system 100, the system 100 includes a transceiver 400 configured to allow sharing of main parts within the HACDs 200 or the gateways 300 (discussed below).

A ground station 300 is usually used as a connector between HACDs 200 and the internet, or between HACDs 200 and users 10. Therefore, the combination of the HACD 200 and the gateways 300 provide a fully-connected global-scale communication system 100 allowing any device to communicate with another device.

Referring to FIG. 2, the global-scale communication system 100 includes the system data processor 110 in communication with an HACD 200 (communication balloons 200*a* and satellites 200*b*) having a transceiver 400 allowing it to communicate with other HACD 200 and gateways 300 (e.g., source gateway 310, destination gateway 320, and/or linking gateway 330).

Figure 3:
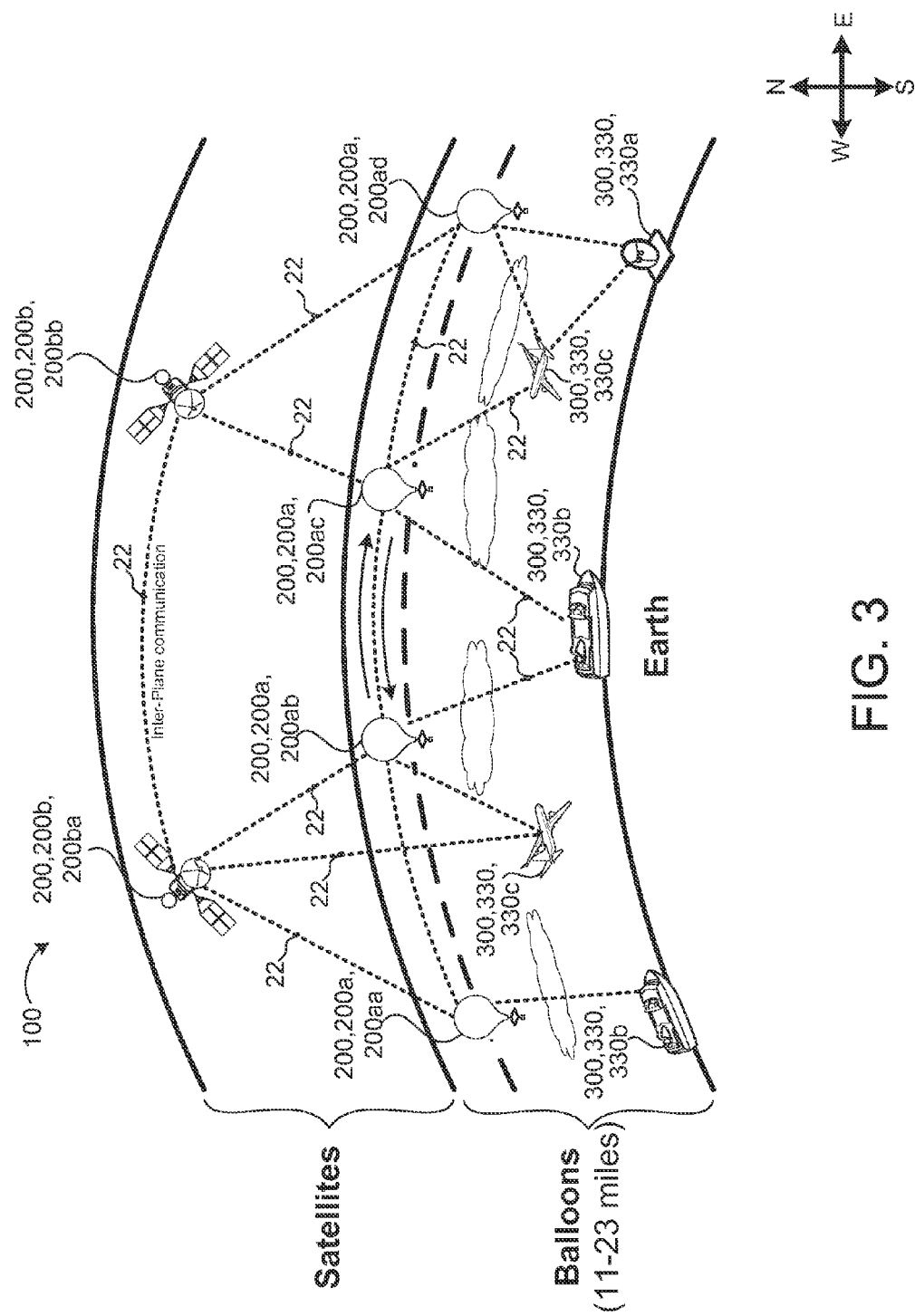
FIG. 3 is a schematic view of an exemplary global-scale communication system showing multiple devices communicating.

Referring to FIG. 3, the linking-gateways 330 may be stationary linking-gateways 330*a* or a moving linking-gateway 330*b*, 330*c* (e.g., positioned on a moving object, such as an airplane, train, boat, or any other moving object). In some examples, a global-scale communication system 100 includes a constellation of balloons 200*a*, a constellation of satellites 200*b*, gateways 300 (source ground station 310, destination ground station 320, and linking-gateway 330), each of which may communicate with the other. The figure shows multiple optical links 22 between the devices that may be possible. For example, the global-scale communication system 100, as shown, includes two satellites 200*ba*, 200*bb*, four communication balloons 200*aa*, 200*ab*, 200*ac*, 200*ad*, and five gateways 300 (moving and stationary). Each of the shown devices 200, 300 may communicate with another device using the optical link 22 as long as the two devices are capable of seeing each other and emitting a communication 20 capable of being received by the other device 200, 300 (using the transceiver 400).

Referring to FIGS. 4A-4F, in some implementations, each device 200, 300 (e.g., HACDs 200, gateways 300), in the global-scale communication system 100, communicating with another device 200, 300 includes a communication device (e.g., transceiver 400) for receiving and transmitting a communication 20. The transceiver 400 includes a first combiner 410*a* and a second combiner 410*b*, an optical device 430, a router 440, and a separator 450. The first combiner 410*a* receives a first optical signal S1 and a second optical signal S2. The first combiner 410*a* combines the first and second optical signals S1, S2 into a third optical signal S3.

In some examples, the transceiver 400 includes a first transmitter 460*a* and second transmitter 460*b*, and a first modulator 470*a* and a second modulator 470*b*. The first transmitter 460*a* transmits the first optical signal S1, and the second transmitter 460*b* transmits the second optical signal S2. The first modulator 470*a* optically communicates with the first transmitter 460*a* and the first combiner 410*a* and modulates the first optical signal S1. The second modulator 470*b* optically communicates with the second transmitter 460*b* and the first combiner 410*a* and modulates the second optical signal S2.

The transmitter 460 converts an electrical signal into an optical signal that is later transmitted between the devices 200, 300. The transmitter 460 may be one of a Fabry-Perot (FP) laser, a distributed feedback (DFB) laser, vertical-cavity-surface-emitting laser (VCSEL), or distributed Bragg reflector (DBR) laser. Other lasers may also be used. FP lasers include an optical gain medium located in a cavity formed by two reflecting facets. In some examples, the transmitter 460 is a Distributed Feedback Laser will (DFB) laser. A DFB laser is a type of laser diode that can be tuned by either changing the temperature or by changing a control current of the DFB laser. The DFB laser has a material refractive index, which is dependent on temperature; therefore, the output wavelength $\lambda$ (e.g., S1, S2) of a DFB laser shifts a few tenths of a nanometer per degree Celsius when the temperature of the material of the DFB laser changes (which changes the refractive index). Similarly, if the control current is increased then the wavelength tunable laser is heated and the output wavelength $\lambda$ of the DFB laser outputting a signal is shifted.

Figure 5:
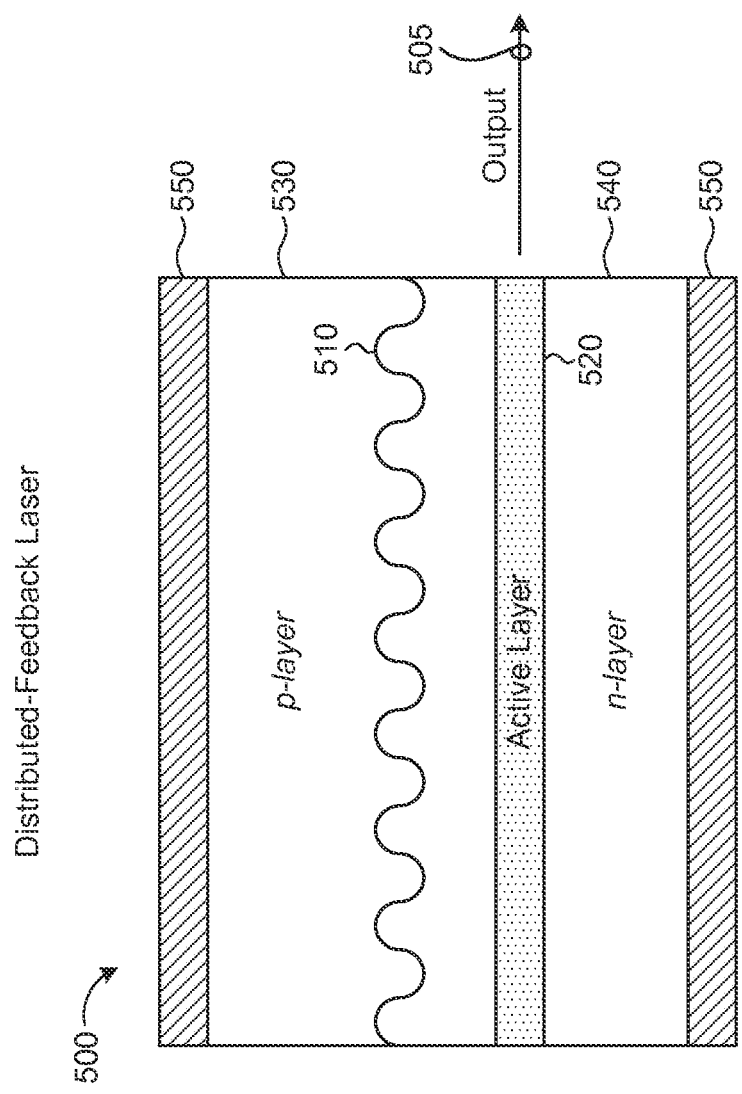
FIG. 5 schematic view of a DFB laser used in an exemplary tunable laser.

As shown in FIG. 5, the DFB laser 500 does not have two mirrors that form an optical cavity like other types of lasers. Instead, the DFB laser 500 has a corrugated layer 510 etched internally above an active layer 520 between a p-type layer 530 and an n-type layer 540. The p-type layer 530 and the n-type layer 540 are surrounded by a metalized layer 550. The corrugated layer 510 forms an optical grating that reflects light having a specific wavelength $\lambda$. The grating 510 stabilizes the output wavelength $\lambda$ 505. The output wavelength $\lambda$ may change with temperature changes that cause the refractive index of the grating 510 to change. The grating 510 acts as the wavelength selection element for at least one of the mirrors and provides feedback, reflecting light back into the cavity to form the resonator. The grating 510 of the DFB laser 500 reflects a narrow band of wavelengths $\lambda$ that leads to producing only a single longitudinal lasing mode. When the temperature of the DFB laser 500 changes, the grating 510 changes, because it depends on the refractive index which depends on temperature. Thus, a change in the refractive index alters the wavelength selection of the grating structure 510 and provides a tunable laser. Another way to tune the laser is to alter the current powering the laser, because the current change causes the temperature to change within the laser. The DBR laser is similar to the DFB laser since they both operate in a single longitudinal lasing mode, which produces a narrow band of wavelengths $\lambda$. VCSEL emit the light perpendicular to the wafer surface rather than at the edge of the chip, i.e., parallel to the wafer surface, as the FP, DFB, or DBR lasers do. The VCSEL includes a gain medium in a very short vertical cavity (about 1 μm) surrounded by Bragg mirrors. The Bragg mirrors include multiple layers of alternating high and low refractive-index material.

Referring back to FIGS. 4A-4F, the modulator 470 modulates an inputted beam of light. In this case, the beam of light (S1, S2) is modulated and then carried over free space; however, the beam of light may be propagated through an optical waveguide. Some known modulators may be amplitude modulators, phase modulators, and polarization modulators. Other types of modulators may also be used. In some examples, modulating a light beam is accomplished by modulating the current driving the light source, e.g., a laser diode (known as direct modulation). External modulators may be used as well, which modulate the signal after being transmitted from the transmitter 460.

The first signal processor 420a (e.g., an amplifier) is in optical communication with the first combiner 410a. The first signal processor 420a processes the third optical signal S3 and sends the processed third optical signal S3' to the optical device 430, which is in optical communication with the first signal processor 420a. In some examples, the first signal processor 420a is an optical amplifier 420a that amplifies the optical signal power. In some examples, the optical amplifier 420a includes an erbium doped fiber amplifier, an erbium/ytterbium co-doped fiber amplifier, an ytterbium doped fiber amplifier, a thulium doped fiber amplifier, a holmium doped fiber amplifier, or a rare earth doped fiber amplifier.

The optical device 430 has a first device port DP1, a second device port DP2, a third device port DP3, and a fourth device port DP4. The optical device 430 receives in the first device port DP1 the processed third optical signal S3' from the first signal processor 420a. The optical device 430 separates the processed third optical signal S3' back into the first and second optical signals S1', S2'. After separating the third optical signal S3', the optical device 430 sends the first optical signal S1' out of the third device port DP3 and sends the second optical signal S2' out of the second device port DP2. Moreover, the optical device 430 receives a fourth optical signal S4 in the third device port DP3 and sends the fourth optical signal S4 out of the fourth device port DP4. The third device port DP3 simultaneously transmits the first signal S1' while receiving the fourth signal S4.

The router 440 has a first router port RP1, a second router port RP2, and a third router port RP3. The first router port RP1 is in optical communication with the second device port DP2. Therefore, the router 440 receives in the first router port RP1 the second signal S2' from the second device port DP2; then, the router 440 sends the second optical signal S2' out of the second router port RP2. The router 440 receives a fifth optical signal S5 in the second router port RP2 and sends the fifth optical signal S5 out of the third router port RP3.

The second combiner 410b is in optical communication with the optical device 430 and the router 440. The second combiner 410b receives the fourth optical signal S4 outputted from the fourth device port DP4 of the optical device 430, and the fifth optical signal S5 from the third router port RP3 from the router 440 and combines the fourth and fifth optical signals S4, S5 into a sixth optical signal S6 before sending the sixth optical signal S6 to the second signal processor 420b.

The second signal processor 420b is in optical communication with the second combiner 410b and processes the sixth optical signal S6 resulting in a processed sixth optical signal S6'. The signal processor 420b, which is optically communicating with the separator 450, sends the processed sixth signal S6' to the separator 450. In some examples, the second signal processor 420b is an optical amplifier 420b. The optical amplifier 420b includes an erbium doped fiber amplifier, an erbium/ytterbium co-doped fiber amplifier, an ytterbium doped fiber amplifier, a thulium doped fiber amplifier, a holmium doped fiber amplifier, or a rare earth doped fiber amplifier.

Finally, the separator 450 receives the processed sixth optical signal S6' and separates the sixth optical signal S6' back into the fourth and fifth optical signals S4', S5'. After separating the processed sixth signal S6', the separator 450 routes the fourth amplified optical signal S4' to a first receiver 480a and the fifth amplified optical signal S5' to a second optical receiver 480b. A receiver 480 receives an optical signal and recovers the signal as an electrical signal. The receiver 480 includes the photodetector that converts light into electricity using the photoelectric effect. Photodetectors are mainly made from indium gallium arsenide. Other material may be used. In some examples, the photodetector is a p-n photodiodes, p-i-n photodiodes, or an avalanche photodiode.

Figure 4A:
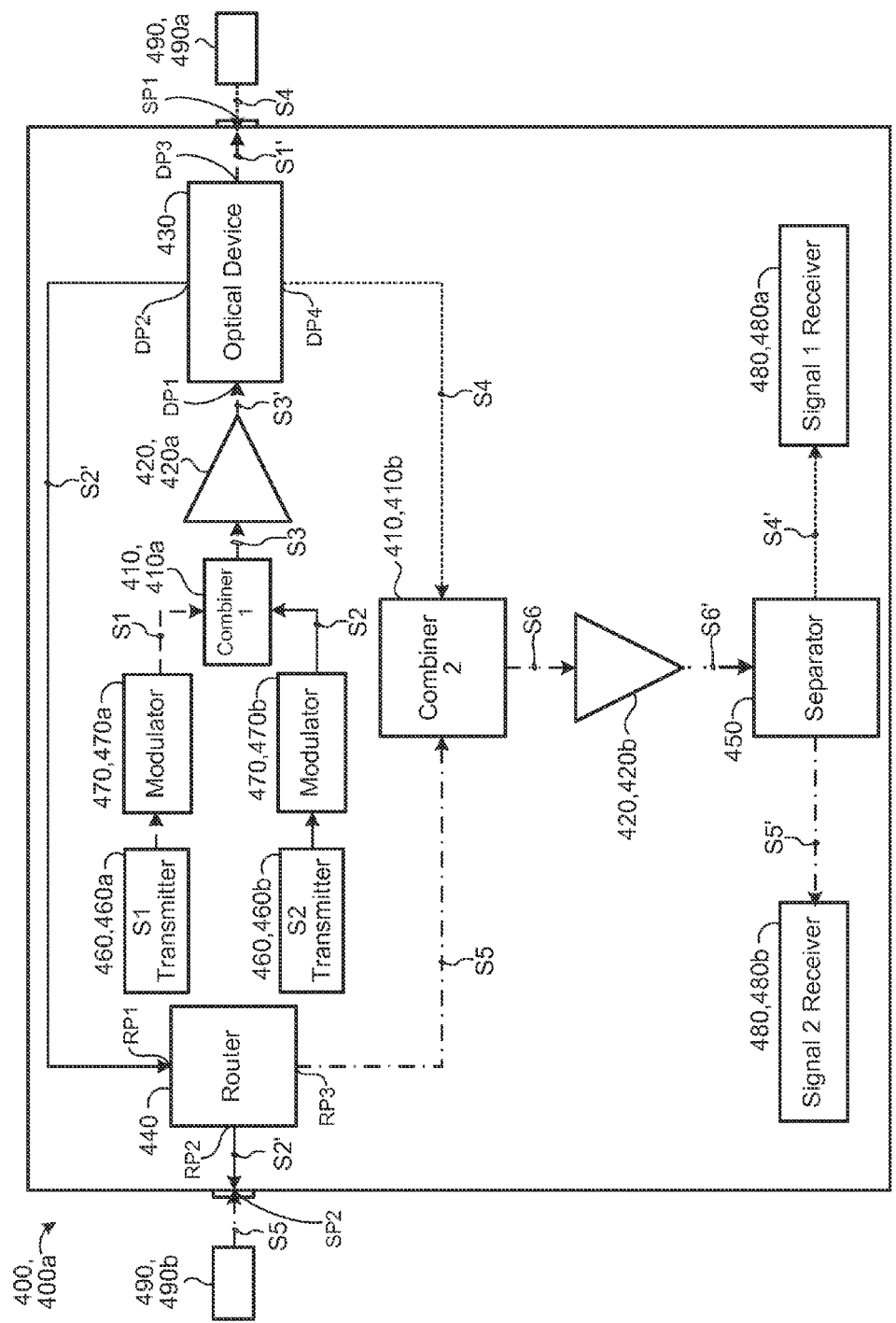
FIGS. 4A-4F are schematic views of an exemplary transceiver.
Figure 4B:
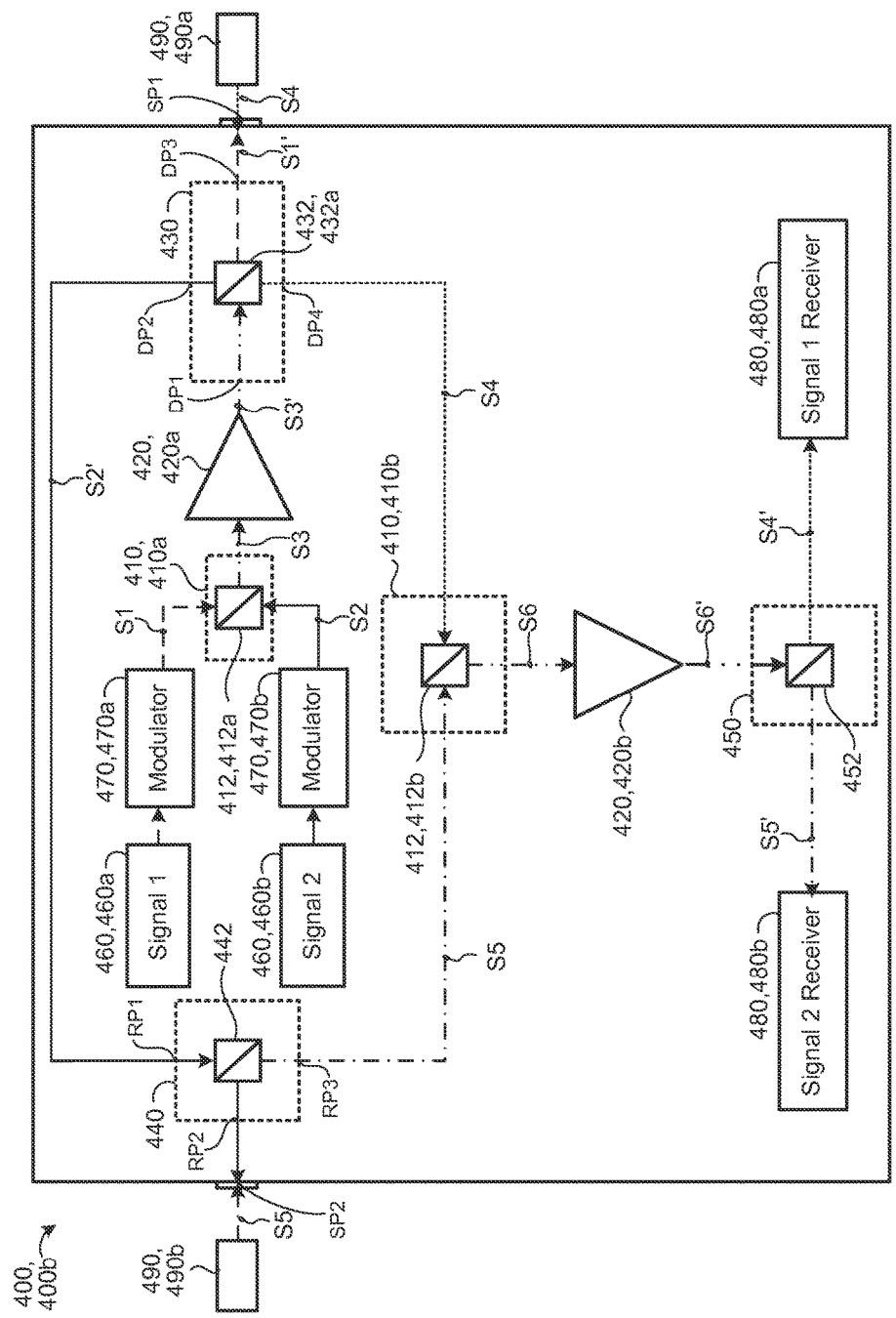

Referring to FIG. 4B, in some implementations, the first and second combiners 410a, 410b each includes a wavelength division multiplexer (WDM) 412a, 412b. The WDM 412 multiplexes or demultiplexes optical signals. A multiplexer (MUX) combines several input signals and outputs a combined signal of the separate signals. The multiplexed signal is transmitted through a physical wire, which saves the cost of having multiple wires for each signal. A demultiplexer (DEMUX) is the reverse process of the MUX. The demultiplexer receives the multiplexed signal and divides it into the separate original signals that were originally combined. Therefore, to combine multiple signals into one signal, a MUX is used; while, to combine a signal into multiple signals, a DEMUX is used. Multiplexing is a method used in optical networks to utilize the large bandwidth of optics to their full extent. Multiplexing enables several virtual channels to be formed on a single fiber. Therefore, multiplexing several optic signals increases the connectivity of a network. Time division multiplexing (TDM) is a method used to multiplex several signals onto one fiber optic. TDM multiplexes several signals by establishing different virtual channels using different time slots. Wavelength division multiplexing (WDM) multiplexes the signals by having different virtual channels use different wavelengths.

As shown, the optical device 430 includes a WDM 432a having four ports (i.e., four inputs/outputs). The four ports of the WDM 432a allow the WDM 432a to simultaneously receive/transmit from fours ports DP1, DP2, DP3, DP4. The wavelength division multiplexer 432a receives in the first device port DP1 the processed third optical signal S3' from the first signal processor 420a. The WDM 432a separates the processed third optical signal S3' back into the first and second optical signals S1', S2'. After separating the third optical signal S3', the wavelength division multiplexer 432a sends the first optical signal S1' out of the third device port DP3 and sends the second optical signal S2' out of the second device port DP2. Moreover, the wavelength division multiplexer 432a receives a fourth optical signal S4 in the third device port DP3 and sends the fourth optical signal S4 out of the fourth device port DP4. The third device port DP3 simultaneously transmits the first signal S1' while receiving the fourth signal S4.

The router 440 includes a WDM 442 that multiplexes the second amplified signal S2' and the fifth signal S5. Since the router 440 includes three receiver ports RP1, RP2, RP3, then the router WDM 442 used is a 3-port WDM 452.

In addition, the separator 450 includes a wavelength division multiplexer 452 for demultiplexing the sixth signal S6 into the fourth signal S4 and the fifth signal S5. Moreover, since the separator 450 includes three separator ports, then the router WDM 440 uses a 3-port WDM 452.

Figure 4C:
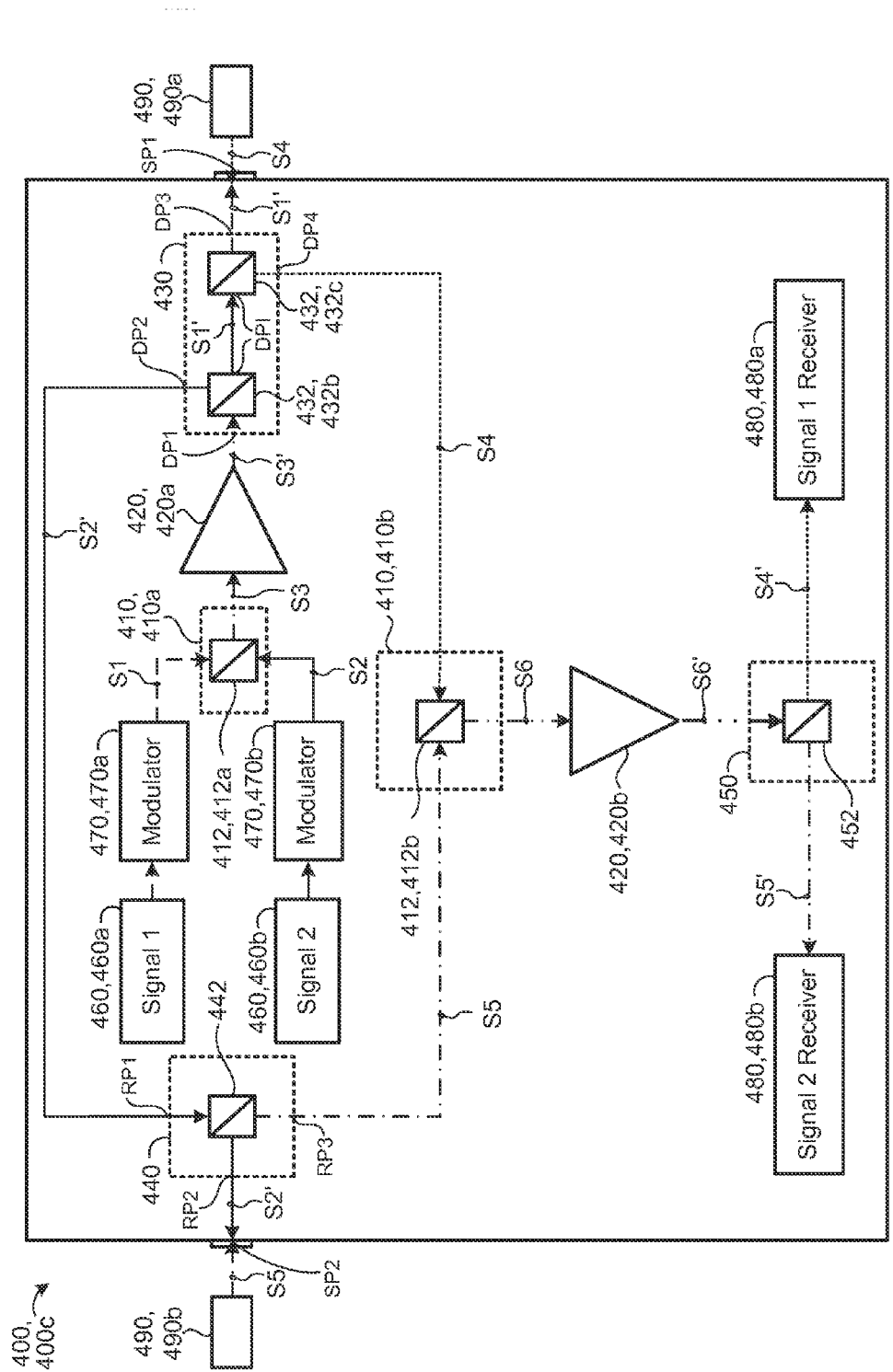

Referring to FIG. 4C, in some examples, the optical device 430 includes a first and a second wavelength division multiplexer 432b, 432c (instead of one 4-port WDM 432a as shown in FIG. 4B). The 3-port WDM 432b, 432c can only receive/transmit 3 signals. Therefore, two 3-port WDMs 432b, 432c are used instead of one 4-port WDM 432a as discussed in FIG. 4B. The 3 port-WDMs 432b, 432c are connected by an inter-device port DPI, resulting in a 4-port optical device 430.

Figure 4D:
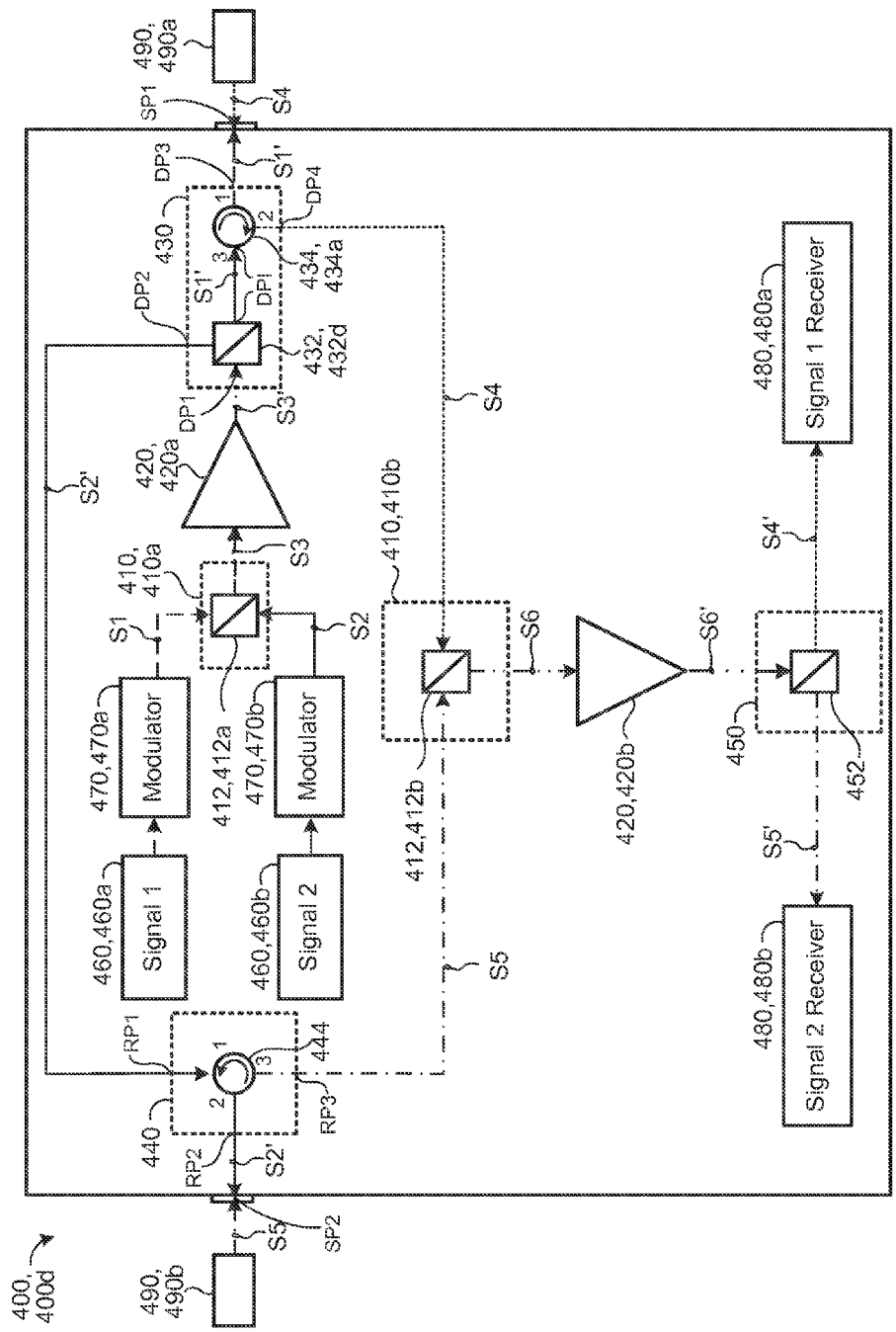

Referring to FIG. 4D, in some implementations, the optical device 430 includes a WDM 432d (3-port WDM) and a circulator 434, and the router 440 includes a circulator 444. The 3-port WDM 432d receives the third amplified signal S3' and separates it into the first amplifier signal S1' and the second amplified signal S2'.

A circulator 434 is a component used in fiber optics systems to separate optical signals travelling in opposite directions. A circulator 434 has non-reciprocal properties allowing the properties of light passing in one direction to remain the same when another light signal passes in the opposite direction. The optical path of a signal depends on the propagation direction as opposed to wavelength only, allowing the re-use of the same wavelength for upstream and downstream transmissions. Optical circulators 434 usually include three ports 1, 2, 3 designed in such a way that a signal entering any port outputs the next port, clockwise or counter-clockwise. For example, in an optical circulator 434 having a first port 1, a second port 2, and a third port 3 if an optical signal enters port 1, the optical signal will exit port 2. Similarly, if an optical signal enters port 2, it is outputted from port 3, and if an optical signal enters port 3 it is outputted from port 1. Optical circulators 434 allow receiving and transmitting data through the same port, i.e., they include a bi-directional port.

The circulator 434a includes a first circulator port 1 being the same as the third device port DP3, a second circulator port 2 being the same as the fourth device port DP4, and a third circulator port 3 being the same as the inter-device port DPI connecting the 3-port WDM 432d with the circulator 434a. The circulator 434a receives the fourth signal S4 into its first circulator port 1 (third device port 3 DP3) and circulates in a clockwise position the fourth signal S4 outputting the fourth signal S4 through this second circulator port (fourth device port DP4). In addition, the circulator 434a receives the amplified first signal S1' from the 3-port WDM 432d and circulates the amplified first signal S1' to output through the first circulator port 1 (third device port 3 DP3). Therefore, the first circulator port 1 is a bidirectional port, since it transmits the first amplified signal S1' and receives the fourth signal S4.

The combination of the 3-port WDM 432d and a circulator 434a provide an optical device having four ports DP1, DP2, DP3, DP4. Such combination, is capable of receiving/ transmitting multiple signals S1', S2', S3', S4' and allows for a bidirectional transmission/receiving of the signals (e.g., S1', S4).

In some implementations, the router 440 includes a circulator 444, which behaves similarly to the circulator 434 described with respect to the optical device 430. Therefore the circulator 444 of the router 440 includes first circulator port 1 (first router port RP1), second circulator port 2 (second router port RP2), and third circulator port 3 (third router port RP3). In this case, the circulator 444 receives the second amplified signal S2' through its first port 1 (first router port RP1) and circulates the second amplified signal S2' to output through its second port 2 (second router port RP2). The circulator's second port 2 (second router port RP2) receives the fifth signal S5 and outputs the fifth signal S5 through its third port 3 (third router port RP3). Therefore, the circulator's second port 2 (second router port RP2) is a bidirectional port since it receives a first signal e.g., the fifth signal S5, and transmits a second signal, e.g., the amplified second signal S2'.

Figure 4E:
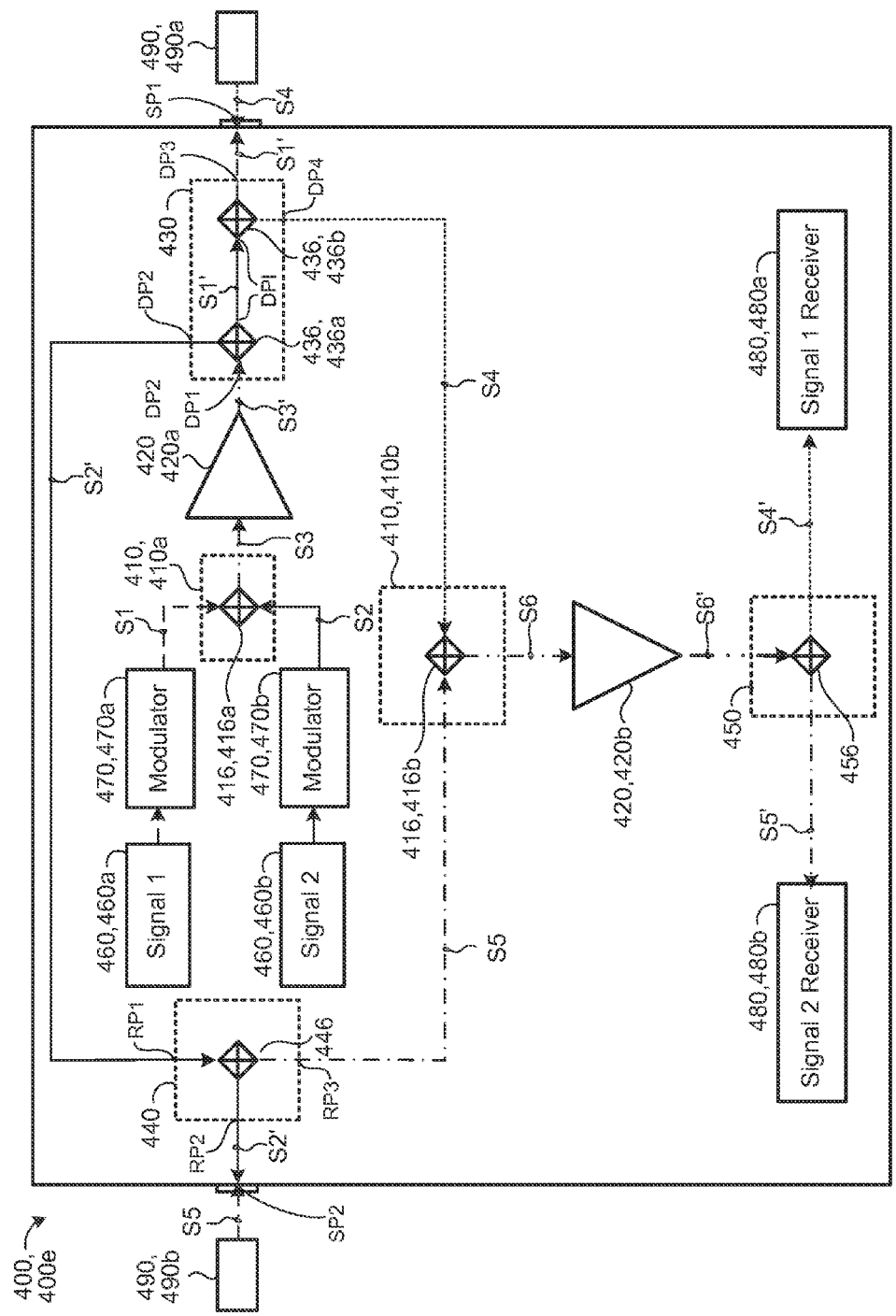

Referring to FIG. 4E, in some implementations, the first and second combiners 410a, 410b each includes an interleaver 416a, 416b. An optical interleaver 416 is a three port passive device used in fiber optics communication for combining two sets of dense wavelength-division multiplexing (DWDM) channels (odd and even channels) into a composite signal stream in an interleaving way. The interleaver 416 combines/separates two sets of dense wavelength-division multiplexing channels into/from a composite signal stream in an interleaving manner. There are two types of WDM systems depending on the wavelength patterns: conventional/coarse (CWDM) and dense (DWDM). CWDM provides up to 8 channels in the third transmission window, i.e., C-Band, of silica fibers around 1550 nm. DWDM uses denser channel spacing, but uses the same transmission window as the CWDM. CWDM uses the entire frequency band between the second and third transmission window. Increasing the number of wavelengths in a system will increase the number of channels of the system 100. The first combiner 410a receives the first signal S1 and the second signal S2 and combines the signals S1, S2 into a combined signal S3. The second combiner 410b receives the fourth signal S4 and the fifth signal S5 and combines the signals S4, S5 into one combined signal S6.

Moreover, the optical device 430 may include first and second interleavers 436a, 436b. The first interleaver 436a connects to the second interleaver 436b to the inner device port DPI. The first interleaver 436a receives the third amplified signal S3' (from the first device port DP1) and separates the third amplified signal S3' into the first amplified signal S1' and the second amplified signal S2'. The first interleaver 436a transmits the first amplified signal S1' to the second interleaver 436b, which in turn outputs the first amplified signal S1' through the third device port DP3. The first interleaver 436a outputs the second amplified signal S2' through the second device port DP2.

In addition, the router 440 may also include an interleaver 446. The router interleaver 446 receives the second amplified signal S2' at the first router port RP1 and transmits the second amplified signal S2' through the second router port RP2. In addition the inter-leave or 446 receives the fifth signal S5 at the second router port RP2 and transmits the fifth signal S52 the third router port RP3.

As shown, the separator 450 may include an interleaver 456. The separator interleaver 456 receives the amplified combined signal S6' and separates the amplified combined signal S6' into the fourth amplified signal S4' and the fifth amplified signal S5'.

Figure 4F:
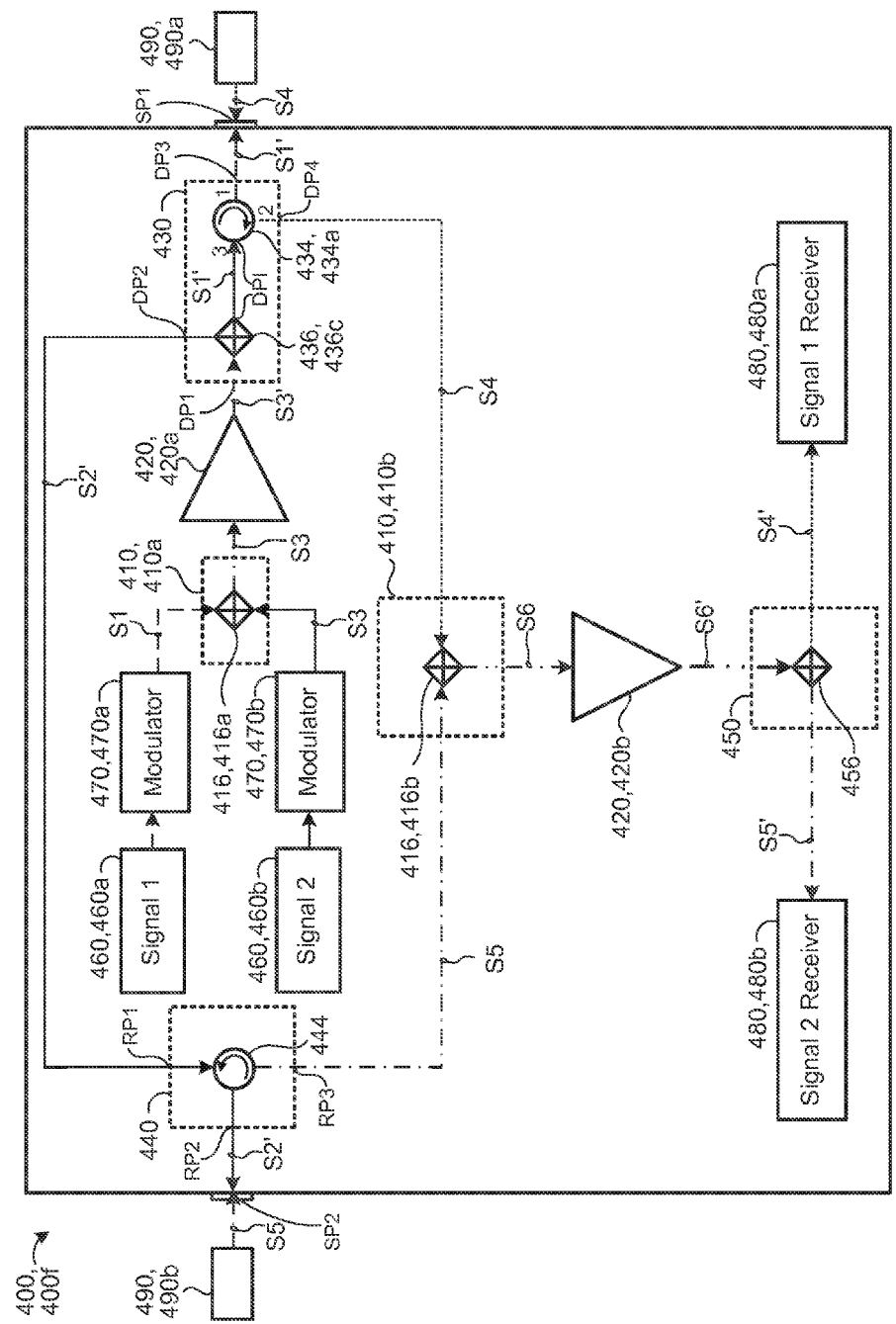

Referring to FIG. 4F, in some implementations, the first and second combiners 410a, 410b each includes an interleaver 416a, 416b (similar to FIG. 4E). The optical device 430 includes an interleaver 436c and a circulator 434a. The interleaver 436c receives the third amplified signal S3' (from the first device port DP1) and separates the third amplified signal S3' into the first amplified signal S1' and the second amplified signal S2'. The interleaver 436c transmits the first amplified signal S1' to the circulator 434a, which in turn outputs the first amplified signal S1' through the third device port DP3. The interleaver 436c outputs the second amplified signal S2' through the second device port DP2. The interleaver 436c connects to the circulator 434a through the inner device port DPI. The circulator 434a includes a first circulator port 1 being the same as the third device port DP3, a second circulator port 2 being the same as the fourth device port DP4, and a third circulator port 3 being the same as the inter-device port DPI connecting the 3-port WDM 432d with the circulator 434a. The circulator 434a receives the fourth signal S4 into its first circulator port 1 (third device port DP3) and circulates in a clockwise position the fourth signal S4 outputting the fourth signal S4 through this second circulator port (fourth device port DP4). In addition, the circulator 434a receives the amplified first signal S1' from the interleaver 436c and circulates the amplified first signal S1' to output through the first circulator port 1 (third device port 3 DP3). Therefore, the first circulator port 1 is a bidirectional port, since it transmits the first amplified signal S1' and receives the fourth signal S4.

Similar to the example shown in FIG. 4D, the router 440 includes a circulator 444. Moreover, similar to the example shown in FIG. 4E, the first and second combiners 410a, 410b each includes an interleaver 416a, 416b, and the separator 450 includes an interleaver 456.

Referring back to FIGS. 4A-4F, the communication device 400 (e.g., transceiver) may include first and second collimators 490. The first collimator optically communicates with the third optical device port DP3 (or the first transceiver port SP1), and the second collimator 490b optically communicates with the second router port RP2 (or the second transceiver port SP2). A collimator 490 is a device that narrows an optical beam before sending the optical beam into free space.

Figure 6:
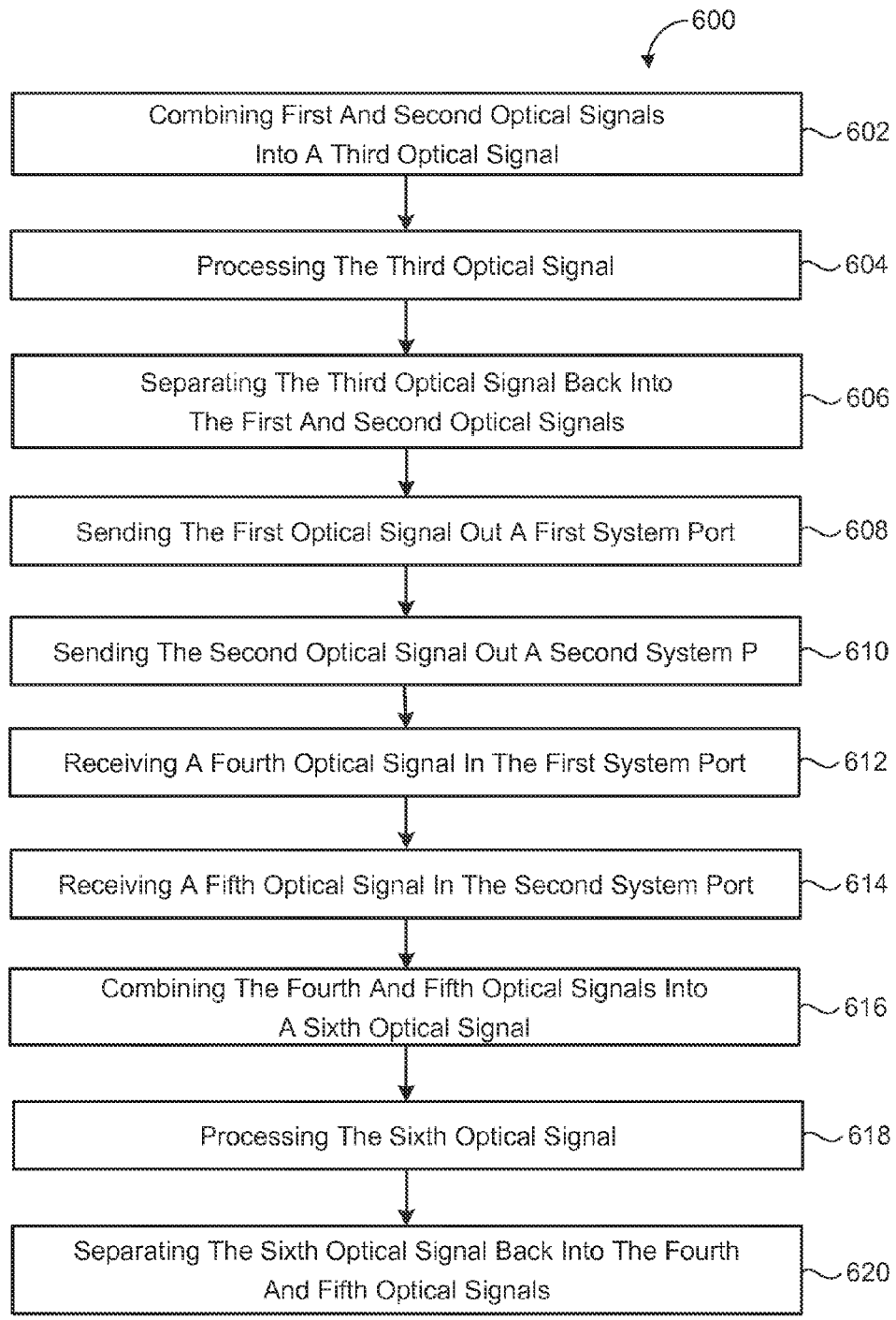
FIG. 6 is a schematic view of an exemplary arrangement of operations of a communication device.

Referring to FIG. 6, in some implementations, a method 600 for communication includes: combining 602 (using a first combiner 410a) first and second optical signals S1, S2 into a third optical signal S3; processing 604 (using a first processor 420a) the third optical signal S3 resulting in a processed optical signal S3'; and separating 606 (using an optical device 430) the processed third optical signal S3' back into a first and second processed optical signals S1', S2'. The method 600 includes: sending 608 the first processed optical signal S1' out a first system port SP1; sending 610 the second processed optical signal S2' out a second system port SP2; receiving 612 a fourth optical signal S4 in the first system port SP1; and receiving 614 a fifth optical signal S5 in the second system port SP2. The method 600 also includes: combining 616 (using a second combiner 410b) the fourth and fifth optical signals S4, S5 into a sixth optical signal S6; processing 618 (using a second processor 420b) the sixth optical signal S6 resulting in a processed sixth optical signal S6'; and separating 620 (using a second separator 450) the sixth processed optical signal S6 back into the fourth and fifth processed optical signals S4', S5'.

In some implementations, the method 600 includes generating the first and second optical signals S1, S2 from first and second transmitters 460a, 460b and modulating the first and second optical signals S1, S2 using first and second modulators 470a, 470b before combining the first and second optical signals S1, S2. After processing (at the second processor 420b) and separating (at the separator 450) the sixth optical signal S6, S6', the method 600 may include sending the fourth processed optical signal S4' to a first optical receiver 480a and sending the fifth processed optical signal S5' to a second optical receiver 480b.

In some examples, combining 602 first and second optical signals S1, S2 includes multiplexing the first and second optical signals S1, S2 (using a first multiplexer 412a) and separating 606 the third processed optical signal S3' includes demultiplexing (using a demultiplexer 432a, e.g., 4-Port WDM) the third processed optical signal back into the first and second amplified optical signals S1', S2'. Alternatively, combining 602 the first and second optical signals S1, S2 may include interleaving (using an interleaver 416a) the first and second optical signals S1, S2, and separating 606 the third processed optical signal S3' includes de-interleaving (using an interleaver 436a) the third processed optical signal S3 back into the first and second processed optical signals S1', S2'. The first and second optical signals S1, S1', S2, S2' include two sets of dense wavelength-division multiplexing channels (DWDM).

In some implementations, combining 616 fourth and fifth optical signals S4, S5 includes multiplexing (using a second multiplexer 412b) the fourth and fifth optical signals S4, S5 and separating 620 (using a multiplexer 452) the sixth processed optical signal S6' includes demultiplexing the sixth processed optical signal S6' back into the fourth and fifth processed optical signals S4', S5'. Alternatively, combining 616 fourth and fifth optical signals S4, S5 may include interleaving (using an interleaver 416b) the fourth and fifth optical signals S4, S5 and separating 620 (using an interleaver 456b) the sixth processed optical signal S6' includes de-interleaving the sixth processed optical signal S6' back into the fourth and fifth processed optical signals S4', S5'. The fourth and fifth optical signals S4, S4', S5, S5' includes two sets of dense wavelength-division multiplexing channels. In some examples, processing 604 the third optical signal S3 and/or processing 618 the sixth optical signal S6 includes amplifying (using an amplifier) the optical signal S3, S6 using an erbium doped fiber amplifier, an erbium/ytterbium co-doped fiber amplifier, an ytterbium doped fiber amplifier, a thulium doped fiber amplifier, a holmium doped fiber amplifier, or a rare earth doped fiber amplifier, which resulted in an amplified signal S3', S6'.

Sending 610 the second processed optical signal S2' out the second system port SP2 may include sending the second processed optical signal S2' through a router 440 having first, second, and third router ports RP1, RP2, RP3, where the processed optical signal S2' is received in the first router port RP1 and sent out of the second router port RP2. Receiving 614 the fifth optical signal S5 in the second system port SP2 includes receiving the fifth optical signal S5 through the router 440, where the fifth optical signal S5 is received in the second router port RP2 and sent out of the third router port RP3. The router 440 includes a wavelength division multiplexer 442, an optical interleaver 446, an optical circulator 444, or a combination thereof. The wavelength division multiplexer 442 multiplexes or demultiplexes optical signals, and the interleaver 446 combines/separates two sets of dense wavelength-division multiplexing channels into/from a composite signal stream in an interleaving manner. The optical circulator 444 has three circulator ports 1, 2, 3, an optical signal received in any one circulator port 1, 2, 3 may be routed to exit an adjacent circulator port 1, 2, 3 in a clockwise or counter-clockwise order.

In some implementations, separating 606 the third processed optical signal S3' and sending 608 the first processed optical signal S1' out the first system port SP1 includes sending the third processed optical signal S3' into an optical device 430 having first, second, third and fourth device ports DP1-DP4. The first optical port DP1 receives the third optical signal S3' and separates the third signal into the first and second processed optical signals S1', S2'. The first processed optical signal S1' is sent out of the third device port DP3 and the second optical signal is sent out of the second device port DP2. Receiving 612 the fourth optical signal S4 includes receiving the fourth optical signal S4 in the third device port DP3 and sending the fourth optical S4 signal out of the fourth device port DP4. The optical device 430 includes a wavelength division multiplexer 432, an optical interleaver 436, an optical circulator 444, or a combination thereof. The wavelength division multiplexer 432 multiplexes or demultiplexes optical signals, and the interleaver 446 combines/separates two sets of dense wavelength-division multiplexing channels into/from a composite signal stream in an interleaving manner. The optical circulator 444 has three circulator ports 1, 2, 3, an optical signal received in any one circulator port 1, 2, 3 may be routed to exit an adjacent circulator port 1, 2, 3 in a clockwise or counter-clockwise order.

Various implementations of the systems and techniques described here can be realized in digital electronic circuitry, integrated circuitry, specially designed ASICs (application specific integrated circuits), FPGAs (field-programmable gate arrays), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit), or an ASIC specially designed to withstand the high radiation environment of space (known as "radiation hardened", or "rad-hard").

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A communication device comprising:
   an optical device comprising first, second, third and fourth device ports;
   a router in optical communication with the optical device; and
   a combiner in optical communication with the optical device and the router;
   when the optical device receives a first combined optical signal, the optical device receives the first combined optical signal in the first device port, the optical device separates the first combined signal into first and second optical signals, sends the first optical signal out of the third device port to a first input/output, and sends the second optical signal out of the second device port to the router, the router routing the second optical signal to a second input/output; and
   when the optical device receives a third optical signal from the first input/output, the optical device receives the third optical signal in the third device port and sends the third optical signal out of the fourth device port to the combiner, the router receives a fourth optical signal from the second input/output and routes the fourth optical signal to the combiner, the combiner combining the third and fourth optical signals as a second combined optical signal.

2. The communication device of claim 1, further comprising:
   a first signal processor in optical communication with the optical device, the first processor processing the first combined optical signal and sending the processed first combined optical signal to the optical device.

3. The communication device of claim 2, further comprising:
   a second signal processor in optical communication with the combiner, the second signal processor processing the second combined optical signal; and
   a separator in optical communication with the second signal processor, the separator separating the second combined optical signal back into the third and fourth optical signals.

4. The communication device of claim 3, wherein the first signal processor or the second signal processor comprises an optical amplifier.

5. The communication device of claim 4, wherein the optical amplifier comprises an erbium doped fiber amplifier, an erbium/ytterbium co-doped fiber amplifier, an ytterbium doped fiber amplifier, a thulium doped fiber amplifier, a holmium doped fiber amplifier, or a rare earth doped fiber amplifier.

6. The communication device of claim 1, wherein the optical device comprises a wavelength division multiplexer, an optical interleaver, an optical circulator, or a combination thereof, the wavelength division multiplexer multiplexing or demultiplexing optical signals, the interleaver combining/separating two sets of dense wavelength-division multiplexing channels into/from a composite signal stream in an interleaving manner, the optical circulator having three circulator ports, an optical signal received in any one circulator port routed to exit an adjacent circulator port in a clockwise or counter-clockwise order.

7. The communication device of claim 1, wherein the router comprises first, second, and third router ports, the first router port in optical communication with the second device port, the router:
   receiving in the first router port the second optical signal from the second device port;
   sending the second optical signal out of the second router port;
   receiving the fourth optical signal in the second router port; and
   sending the fourth optical signal out of the third router port.

8. The communication device of claim 7, wherein the router comprises a wavelength division multiplexer, an optical interleaver, an optical circulator, or a combination thereof, the wavelength division multiplexer multiplexing or demultiplexing optical signals, the interleaver combining/separating two sets of dense wavelength-division multiplexing channels into/from a composite signal stream in an interleaving manner, the optical circulator having three circulator ports, an optical signal received in any one circulator port routed to exit an adjacent circulator port in a clockwise or counter-clockwise order.

9. A communication device comprising:
a first combiner receiving and combining first and second optical signals into a third optical signal;
a first signal processor in optical communication with the first combiner, the first processor processing the third optical signal;
an optical device in optical communication with the first signal processor and having first, second, third and fourth device ports, wherein:
when the optical device receives in the first device port the third optical signal from the first signal processor, the optical device separates the third optical signal back into the first and second optical signals, sending the first optical signal out of the third device port, and sending the second optical signal out of the second device port; and
when the optical device receives a fourth optical signal in the third device port, the optical device sends the fourth optical signal out of the fourth device port;
a router having first, second, and third router ports, the first router port in optical communication with the second device port, wherein:
when the router receives in the first router port the second optical signal from the second device port, the router sends the second optical signal out of the second router port; and
when the router receives a fifth optical signal in the second router port, the router sends the fifth optical signal out of the third router port;
a second combiner in optical communication with the optical device and the router, when the second combiner receives the fourth optical signal from the optical device and the fifth optical signal from the router, the second combiner combining the fourth and fifth optical signals into a sixth optical signal;
a second signal processor in optical communication with the second combiner, the second signal processor processing the sixth optical signal; and
a separator in optical communication with the second signal processor, the separator separating the sixth optical signal back into the fourth and fifth optical signals.

10. The communication device of claim 9, further comprising:
a first transmitter transmitting the first optical signal;
a second transmitter transmitting the second optical signal;
a first modulator in optical communication with the first transmitter and the first combiner, the first modulator modulating the first optical signal; and
a second modulator in optical communication with the second transmitter and the first combiner, the second modulator modulating the second optical signal.

11. The communication device of claim 9, wherein the separator routes the fourth optical signal to a first receiver and the fifth optical signal to a second receiver.

12. The communication device of claim 9, wherein the first combiner, the second combiner, and the separator each comprises a wavelength division multiplexer or an optical interleaver, the wavelength division multiplexer multiplexing or demultiplexing optical signals, the interleaver combining/separating two sets of dense wavelength-division multiplexing channels into/from a composite signal stream in an interleaving manner.

13. The communication device of claim 9, wherein the first signal processor or the second signal processor comprises an erbium doped fiber amplifier, an erbium/ytterbium co-doped fiber amplifier, an ytterbium doped fiber amplifier, a thulium doped fiber amplifier, a holmium doped fiber amplifier, or a rare earth doped fiber amplifier.

14. The communication device of claim 9, wherein the optical device comprises a wavelength division multiplexer, an optical interleaver, an optical circulator, or a combination thereof, the wavelength division multiplexer multiplexing or demultiplexing optical signals, the interleaver combining/separating two sets of dense wavelength-division multiplexing channels into/from a composite signal stream in an interleaving manner, the optical circulator having three circulator ports, an optical signal received in any one circulator port routed to exit an adjacent circulator port in a clockwise or counter-clockwise order.

15. The communication device of claim 9, wherein the router comprises a wavelength division multiplexer, an optical interleaver, an optical circulator, or a combination thereof, the wavelength division multiplexer multiplexing or demultiplexing optical signals, the interleaver combining/separating two sets of dense wavelength-division multiplexing channels into/from a composite signal stream in an interleaving manner, the optical circulator having three circulator ports, an optical signal received in any one circulator port routed to exit an adjacent circulator port in a clockwise or counter-clockwise order.

16. The communication device of claim 9, further comprising:
a first collimator in optical communication with the third device port; and
a second collimator in optical communication with the second router port.

17. A communication device comprising:
a first transmitter transmitting a first optical signal;
a second transmitter transmitting a second optical signal;
a first modulator in optical communication with the first transmitter, the first modulator modulating the first optical signal;
a second modulator in optical communication with the second transmitter, the second modulator modulating the second optical signal;
a first combiner combining the first and second optical signals into a third optical signal;
a first amplifier in optical communication with the first combiner, the first amplifier amplifying the third optical signal;
an optical device in optical communication with the first amplifier and having first, second, third and fourth device ports, the optical device configured to:
when the optical device receives in the first device port the third optical signal from the first amplifier, the optical device separates the third optical signal back into the first and second optical signals, sending the first optical signal out of the third device port, and sending the second optical signal out of the second device port; and when the optical device receives a fourth optical signal in the third device port, the optical device sends the fourth optical signal out of the fourth device port;

a router having first, second, and third router ports, the first router port in optical communication with the second device port, the router configured to:
when the router receives in the first router port the second optical signal from the second device port, the router sends the second optical signal out of the second router port; and
when the router receives a fifth optical signal in the second router port, the router sends the fifth optical signal out of the third router port;

a second combiner in optical communication with the optical device and the router, when the second combiner receives the fourth optical signal from the optical device and the fifth optical signal from the router, the second combiner combining the fourth and fifth optical signals into a sixth optical signal a second amplifier in optical communication with the second combiner, the second amplifier amplifying the sixth optical signal; and a separator in optical communication with the second amplifier, the separator separating the sixth optical signal back into the fourth and fifth optical signals, the separator routing the fourth optical signal to a first receiver and the fifth optical signal to a second receiver.

18. A method comprising:
combining first and second optical signals into a third optical signal;
processing the third optical signal;
separating the third optical signal back into the first and second optical signals;
sending the first optical signal out a first system port;
sending the second optical signal out a second system port;
receiving a fourth optical signal in the first system port;
receiving a fifth optical signal in the second system port;
combining the fourth and fifth optical signals into a sixth optical signal;
processing the sixth optical signal; and
separating the sixth optical signal back into the fourth and fifth optical signals,
wherein separating the third optical signal and sending the first optical signal out the first system port comprises sending the third optical signal into an optical device having first, second, third and fourth device ports, the third optical signal received in the first device port and separated into the first and second optical signals, the first optical signal sent out of the third device port and the second optical signal sent out of the second device port, and
wherein receiving the fourth optical signal comprises receiving the fourth optical signal in the third device port and sending the fourth optical signal out of the fourth device port.

19. The method of claim 18, further comprising:
generating the first and second optical signals; and
modulating the first and second optical signals before combining the first and second optical signals.

20. The method of claim 18, further comprising, after processing and separating the sixth optical signal:
sending the fourth optical signal to a first optical receiver; and
sending the fifth optical signal to a second optical receiver.

21. The method of claim 18, wherein combining first and second optical signals comprises multiplexing the first and second optical signals and separating the third optical signal comprises demultiplexing the third optical signal back into the first and second optical signals.

22. The method of claim 18, wherein combining first and second optical signals comprises interleaving the first and second optical signals, the first and second optical signals comprising two sets of dense wavelength-division multiplexing channels, and separating the third optical signal comprises de-interleaving the third optical signal back into the first and second optical signals.

23. The method of claim 18, wherein combining fourth and fifth optical signals comprises multiplexing the fourth and fifth optical signals and separating the sixth optical signal comprises demultiplexing the sixth optical signal back into the fourth and fifth optical signals.

24. The method of claim 18, wherein combining fourth and fifth optical signals comprises interleaving the fourth and fifth optical signals, the fourth and fifth optical signals comprising two sets of dense wavelength-division multiplexing channels, and separating the sixth optical signal comprises de-interleaving the sixth optical signal back into the fourth and fifth optical signals.

25. The method of claim 18, wherein processing the third or sixth optical signal comprises amplifying the third or sixth optical signal using an erbium doped fiber amplifier, an erbium/ytterbium co-doped fiber amplifier, an ytterbium doped fiber amplifier, an thulium doped fiber amplifier, a holmium doped fiber amplifier, or a rare earth doped fiber amplifier.

26. The method of claim 18, wherein sending the second optical signal out the second system port comprises sending the second optical signal through a router having first, second, and third router ports, the second optical signal received in the first router port and sent out of the second router port; and
wherein receiving the fifth optical signal in the second system port comprises receiving the fifth optical signal through the router, the fifth optical signal received in the second router port and sent out of the third router port.

27. The method of claim 26, wherein the router comprises a wavelength division multiplexer, an optical interleaver, an optical circulator, or a combination thereof, the wavelength division multiplexer multiplexing or demultiplexing optical signals, the interleaver combining/separating two sets of dense wavelength-division multiplexing channels into/from a composite signal stream in an interleaving manner, the optical circulator having three circulator ports, an optical signal received in any one circulator port routed to exit an adjacent circulator port in a clockwise or counter-clockwise order.

28. The method of claim 18, wherein the optical device comprises a wavelength division multiplexer, an optical interleaver, an optical circulator, or a combination thereof, the wavelength division multiplexer multiplexing or demultiplexing optical signals, the interleaver combining/separating two sets of dense wavelength-division multiplexing channels into/from a composite signal stream in an interleaving manner, the optical circulator having three circulator ports, an optical signal received in any one circulator port routed to exit an adjacent circulator port in a clockwise or counter-clockwise order.

* * * * *